(12) United States Patent
Tan et al.

(10) Patent No.: US 10,907,320 B2
(45) Date of Patent: Feb. 2, 2021

(54) TEST APPARATUS FOR PILE-SOIL INTERFACE SHEAR MECHANICAL PROPERTIES

(71) Applicants: Central South University, changsha (CN); Henan Polytechnic University, Jiaozuo (CN)

(72) Inventors: Junkun Tan, changsha (CN); Jiaqi Guo, Jiaozuo (CN); Shanxiu Huang, Jiaozuo (CN); Shifan Qiao, Changsha (CN)

( * ) Notice: Subject to any disclaimer, the term of this patent is extended or adjusted under 35 U.S.C. 154(b) by 62 days.

(21) Appl. No.: 16/533,831

(22) Filed: Aug. 7, 2019

(65) Prior Publication Data

US 2019/0376251 A1 Dec. 12, 2019

Related U.S. Application Data

(63) Continuation of application No. PCT/CN2018/107136, filed on Sep. 22, 2018.

(30) Foreign Application Priority Data

Jun. 8, 2018 (CN) .......................... 2018 1 0589024

(51) Int. Cl.
*E02D 33/00* (2006.01)
*G01N 3/06* (2006.01)
*G01N 3/24* (2006.01)

(52) U.S. Cl.
CPC ............. *E02D 33/00* (2013.01); *G01N 3/062* (2013.01); *G01N 3/24* (2013.01); *G01N 2203/0025* (2013.01)

(58) Field of Classification Search
CPC .. G01N 3/062; G01N 3/24; G01N 2203/0025; E02D 33/00
See application file for complete search history.

(56) References Cited

U.S. PATENT DOCUMENTS 4,047,425 A * 9/1977 Handy ...................... G01N 3/08
73/822
4,885,941 A * 12/1989 Vardoulakis ............. G01N 3/08
73/794

(Continued)

FOREIGN PATENT DOCUMENTS

CN 2625883 Y 7/2004
CN 102628767 A 8/2012

(Continued)

OTHER PUBLICATIONS

ISR of PCT/CN2018/107136.

*Primary Examiner* — Natalie Huls
(74) *Attorney, Agent, or Firm* — HYIP (57) ABSTRACT

Embodiments of the present disclosure provide a test apparatus for pile-soil interface shear mechanical properties, comprising a support device, a pressure device, a membrane box, and a thrust device; wherein the support device comprises a bottom plate, a top plate, a support beam, and a plurality of bracing struts, the bottom plate and the top plate being both provided with a through-hole for inserting a model pile. The test apparatus for pile-soil interface shear mechanical properties according to the present disclosure has a simple structure and is easy to operate, which may accurately simulate mechanical properties of pile soils having different types of piled foundations in actual works, thereby facilitating researches on pile-soil testing.

10 Claims, 4 Drawing Sheets

(56) References Cited

U.S. PATENT DOCUMENTS

| | | | | |
|---|---|---|---|---|
| 7,509,882 B2* | 3/2009 | Monteiro | ............ | G01N 3/08 73/862.046 |
| 7,520,177 B2* | 4/2009 | Secq | ............ | G01B 5/30 73/795 |
| 9,383,346 B2* | 7/2016 | Gupta | ............ | G01N 33/24 |
| 10,048,183 B2* | 8/2018 | Ni | ............ | G01N 3/24 |
| 2018/0128725 A1* | 5/2018 | Du | ............ | G01N 3/24 |
| 2018/0136099 A1* | 5/2018 | Zhou | ............ | G01N 3/04 |
| 2019/0137375 A1* | 5/2019 | Belfer | ............ | E02D 1/02 |

FOREIGN PATENT DOCUMENTS

| | | |
|---|---|---|
| CN | 106769478 A | 5/2017 |
| CN | 206531737 A | 9/2017 |
| CN | 108106949 A | 6/2018 |
| CN | 108444817 A | 8/2018 |
| CN | 108444841 A | 8/2018 |
| WO | 2007035946 A | 3/2007 |

* cited by examiner

TEST APPARATUS FOR PILE-SOIL INTERFACE SHEAR MECHANICAL PROPERTIES

TECHNICAL FIELD

Embodiments of the present disclosure relate to the technical field of civil engineering, and more particularly to a test apparatus for pile-soil interface shear mechanical, properties.

BACKGROUND

Rapid development of urban construction boosts many high-rise and ultra-high-rise buildings, which pose a high requirement on the bearing capacity of foundation soils. Piled foundation as a main foundation form is extensively applied in foundation works With accumulated practical experience and in-depth theoretical study in piled foundation works, many new-model piled foundations emerge, such as cast-in-place piles with branches & plates, screw piles, nodular piles, which are developed based on bored piles and precast piles; while long piles of the piled foundation of an ultra-high-rise building in deep-thick soft soil areas are generally friction piles or end-bearing piles, where bearing capacity of the piled foundation is mainly provided by pile frictional resistance. However, computed values of pile frictional resistance provided in the existing Technical Code for Building Pile Foundations are largely deviated; therefore, pile-soil friction properties of different types of piled foundations need to be studied based on model testing so as to provide theoretical grounds for devising a piled foundation of an actual work.

The existing studies on pile-soil interface shear mechanical properties mainly focus on in-situ testing and indoor testing, where the indoor testing mainly adopts a direct shear test and a ring shear test. The indoor shear testing may accurately measure a relative displacement of the pile soil, and meanwhile may measure a nominal displacement of the interface. However, the interfaces of the direct shear test and the ring shear test with the model pile are both planes, which are different from an actual pile (round pile)-soil interface; besides, the boundary conditions in the above shear tests are also different from those in an real pile load transfer process. In an actual work, a horizontal underground pressure of the pile-soil interface will increase linearly with the depth of the pile (see GUO Jiaqi et al., Comparison of the Simple Shear Property Between Dry and Saturated Sand Under High Stress) The Chinese patent publication No. CN106769478 discloses a pile-soil interface shear test device, comprising a round model box, a loading plate, a counter-force beam and a servo loading motor, wherein as an improvement to conventional shear test devices, a column-shaped pile of the device is disposed in a soil body, a lower portion and a peripheral side of the soil body being enclosed; pressure is installed in an upper portion of the soil body; and then the soil body applies pressure to the pile skin. However, the test device fails to consider the factor that the horizontal underground pressure of the pile-soil interface increases with depth of the pile, while change of the horizontal underground pressure has an impact on test results. Therefore, the pile-soil interface friction properties simulated by the test device above are inconsistent with the real pile-soil interface friction properties.

Therefore, a novel test apparatus for pile-soil interface shear mechanical properties is desired to solve the problems above.

SUMMARY OF THE DISCLOSURE

To overcome the drawbacks in the prior art, the present disclosure provides a test apparatus for pile-soil interface shear mechanical properties, which is easy to operate and may simulate, in a more realistic way, actual stresses subjected to a pile-soil structure without leveraging too many sensing devices, thereby reducing complicated theoretical derivations.

To achieve the objective above, the present disclosure provides a test apparatus for pile-soil interface shear mechanical properties, comprising: a support device, a pressure device, a membrane box, and a thrust device; wherein the support device comprises a bottom plate, a top plate, and a support beam, the bottom plate and the top plate being connected via a plurality of bracing struts, the support beam being disposed above the top plate; the pressure device is disposed on the support beam and arranged for applying a vertical pressure against a model pile; a membrane barrel of the membrane box is vertically disposed on the bottom plate and sleeved at a radial outer side of the model pile, an accommodating cavity being provided between the membrane barrel and the model pile; the thrust device is sleeved on the membrane barrel and arranged for applying a plurality of horizontal thrusting forces against the membrane barrel so as to squeeze a model soil in the membrane barrel along a direction perpendicular to an axial direction of the model pile, the plurality of horizontal thrusting forces incrementing linearly from top to down.

Further, the thrust device comprises a thrust cylinder group, a plurality of thrust assemblies evenly arranged along a circumferential direction of a center of the thrust cylinder group, and a protective barrel sleeved on an outer circumferential wall of the thrust cylinder group;

the thrust cylinder group includes a plurality of radially contractile thrust cylinders, the plurality of thrust cylinders being axially stacked on the bottom plate, adjacent two of the thrust cylinders being not fixedly connected;

each of the thrust assemblies includes a vertically arranged push plate, a plurality of horizontally-arranged contractile thrust arms, and a plurality of thrust springs, wherein the plurality of thrust arms are arranged in a same vertical plane along a top-down direction, outer ends of the plurality of thrust arms are all connected to the push plate, inner ends of the plurality of thrust arms are connected to the thrust cylinders, respectively, and the thrust arms are disposed in one-to-one correspondence to the thrust cylinders; each thrust arm is sleeved with one thrust spring; and a plurality of side holes are provided in a side wall of the protective barrel, for the thrust arms and the thrust springs to penetrate through, the thrust springs contact with arcuate steel plate corresponding thereto.

Further, the thrust cylinder is a double-layered cylindrical body structure, an inner-layer cylindrical body and an outer-layer cylindrical body being co-axially sleeved, the inner-layer cylindrical body being enclosed by a plurality of arcuate steel sheets evenly arranged at intervals along a circumferential direction of the inner-layer cylindrical body, the outer-layer cylindrical body being enclosed by a plurality of arcuate steel plates evenly arranged at intervals along a circumferential direction of the outer-layer cylindrical body; a spacing clearance between adjacent two arcuate steel sheets and a spacing clearance between adjacent two arcuate steel plates are staggered internally and externally, each arcuate steel plate being horizontally slidably-fitted with two arcuate steel sheets disposed internal thereto along a circumferential direction of the thrust cylinder; inner ends of the plurality of thrust arms are connected to the arcuate steel plates, respectively; and the thrust arms and the arcuate steel plates are disposed in one-to-one correspondence;

the thrust arms at a same layer connected to the same thrust cylinder are disposed at a same horizontal plane, and the inner ends of the thrust arms at the same layer are all pointed to a central axial line of the thrust cylinder.

Further, the thrust arm comprises a solid rod and a hollow rod, an inner end of the solid rod being connected to an outer sidewall of the arcuate steel plate, an outer end of the solid rod being slidably inserted into the hollow rod.

Further, free lengths of the thrust springs sleeved on the thrust arms at the same layer are equal, and elastic coefficients of the thrust springs sleeved on each layer of thrust arms increment linearly from top to down. The length of a thrust arm is shrunk by adjusting a position of the push plate inwardly (towards a central portion of the circular bottom plate); meanwhile all thrust springs sleeved on the thrust arm are compressed with a same compressed amount, because the elastic coefficients of the thrust springs on each layer of thrust arms increment linearly from top to down, the thrust device produces a plurality of horizontal thrusting forces linearly increasing from top to down to thereby squeeze the model soil inside the membrane barrel via corresponding thrust cylinders (each thrust cylinder corresponds to one layer of thrust arms), which is consistent with the situation in actual works where the subjected underground pressure constantly increases with depth.

Further, a nut is provided on the hollow rod; the thrust springs are disposed between the nut and the arcuate steel plate; and the free lengths and elastic coefficients of all thrust springs are equal. Consistent with the above structural principle, the thrusting force applied by the thrust device against a plurality of thrust cylinders from top to down also increments linearly from top to down, which may effectively simulate the horizontal underground pressure subjected to a pile-soil structure in an actual work.

Further, the top plate and the bottom plate are both circulate plates, the bottom plate and the top plate are both provided with a plurality of positioning devices evenly arranged along a circumferential direction of respective center thereof, and each of the positioning devices includes an elongated slotted eye arranged along a radial direction of the bottom plate, a plurality of clamping posts disposed at two sides of a length direction of the elongated slotted eye, and a latch bolt for positioning internal and external positions of the push plate on the support device. Those skilled in the art may understand that two sides of the upper end and the lower end of the push plate are respectively provided with a limiting block for limiting the upper and lower positions of the push plate, which may effectively prevent up-down misalignment of the push plate during the adjustment process; fitting between the latch bolt and the clamping posts is arranged for positioning the internal and external positions of the push plate at the support device.

Further, a through-hole A and a through-hole B for inserting the model, pile are provided on the bottom plate and the top plate, respectively; the plurality of bracing struts are all arranged through the bottom plate and the top plate from top to down; the support beam is connected to the plurality of bracing struts, a through-hole C being provided on the support beam;

The pressure device comprises vertical loading means, a dowel rod, a pressure sensor, and a displacement sensor; the vertical loading means is detachably disposed on the support beam; the dowel rod is arranged through the through-hole C, one end of which is connected to the vertical loading means, the other end of which is in contact with a top end of the model pile; the pressure sensor and the displacement sensor are sandwiched between the dowel rod and the model pile;

the membrane box comprises a membrane barrel, a permeable plate, and a blank cover; wherein the membrane barrel is made of a flexible material; the permeable plate is disposed inside the membrane barrel to block a lower port of the membrane barrel; the blank cover is disposed at a top portion of the membrane barrel to seal an upper port of the membrane barrel; the permeable plate and the blank cover are provided with a through-hole D and a through-hole E, respectively, an upper end and a lower end of the model pile being arranged through the through-hole E and the through-hole D, respectively.

Further, the permeable plate comprises a permeable plate body and a flexible membrane disposed peripheral to the permeable plate body, the through-hole D being disposed on the permeable plate body; the membrane box further comprises at least three holding-down arms that tightly hold down the blank cover against the membrane barrel; a plurality of through-holes F, the number of which is adapted to the number of holding-down arms, are provided on the top plate, each of the through-holes F being penetrated through by one holding-down arm, lower ends of the holding-down arms being compressed against the blank cover. Those skilled in the art may understand that after the model soil inside the membrane barrel is compacted, the upper port of the membrane barrel is covered by the blank cover; the holding-down arms penetrate through the through-holes F from top to down, lower ends of the holding-down arms are compressed against the blank cover, and the holding-down arms are fixedly connected to the top plate.

Further, the support device comprises three bracing struts, bottom ends of the bracing struts are 50~200 cm lower than the bottom plate, top ends of the bracing struts are 30~200 cm higher than the top plate; the support beam is a trifurcated beam, each beam fork being fixedly connected to one bracing strut; the through-hole C is disposed at a central portion of the trifurcated beam.

Compared with the prior art, the present disclosure has the following beneficial effects:

(1) The test apparatus for pile-soil interface shear mechanical properties comprises: a support device, a pressure device, a membrane box, and a thrust device, wherein the support device comprises a bottom plate, a top plate, a support beam, and a plurality of bracing struts; the pressure device is disposed on the support beam and arranged for applying a vertical pressure against a model pile, the membrane box comprises a membrane barrel, a permeable plate, and a blank cover, wherein the membrane barrel is made of a flexible plastic membrane, the thrust device is sleeved on the membrane barrel and arranged for applying a plurality of horizontal thrusting forces of various strengths against the membrane barrel so as to squeeze a model soil in the membrane barrel along, a direction perpendicular to an axial direction of the model pile. The test apparatus according to the present disclosure has a simple structure and is easy to operate, which may accurately simulate pile-soil mechanical properties of different types of piled foundations in actual works, thereby providing theoretical grounds to devise piled foundations for actual works.

(2) The membrane box of the present disclosure comprises a circular membrane barrel, a permeable plate and a blank cover, wherein the permeable plate comprises a permeable plate body and a first flexible membrane; the membrane barrel is made of a flexible plastic membrane; by applying a sidewise horizontal thrusting force to the membrane barrel, a horizontal stress transfer effect is applied to the pile soil, which realistically simulates a stress state of the pile soil in an actual work and improves the simulation accuracy; meanwhile, the membrane box of the present disclosure enables installation of a plurality of pile-model materials with a relatively large sample size, such as a solid cylindrical concrete sample and a hollow cylinder and is compatible with existing civil instruments in studying mechanical properties of the pile-soil interface under a static load action.

(3) The thrust device of the present disclosure comprises a thrust cylinder group, a plurality of thrust assemblies, and a protective barrel; the thrust cylinder group includes a plurality of radially contractile thrust cylinders, the plurality of thrust cylinders being axially stacked on the bottom plate, adjacent two of the thrust cylinders being not fixedly connected; the thrust cylinder comprises an inner-layer cylindrical body and an outer-layer cylindrical body which are co-axially sleeved, the inner-layer cylindrical body being enclosed by a plurality of arcuate steel sheets evenly arranged at intervals along a circumferential direction of the inner-layer cylindrical body, the outer-layer cylindrical body being enclosed by a plurality of arcuate steel plates evenly arranged at intervals along a circumferential direction of the outer-layer cylindrical body; by adjusting the length of the thrust arm, the thrust spring sleeved thereon applies different horizontal thrusting forces to the pile soil from an outer periphery of the membrane box. The thrust device of the present disclosure is adapted to simulating different horizontal underground pressures subjected to the pile soil under different situations and also adapted to realistic simulation of different underground pressures at any covering stratum and any pile soil position, thereby having a wide applicable scope.

(4) In the present disclosure, free lengths of the thrust springs sleeved on the thrust arms at the same layer are equal, and elastic coefficients of the thrust springs sleeved on each layer of thrust arms increment linearly from top to down. Lengths of the thrust arms are shrunk by adjusting a position of the push plate inwardly; the thrust springs sleeved on the thrust arms are compressed with a same compressed amount; the thrust springs supply horizontal thrusting forces linearly increasing from top to down against the pile-soil interface, which is consistent with the situation in actual works where the subjected underground pressure constantly increases with depth; therefore, the present disclosure may realistically simulate the distribution of horizontal underground pressures subjected to the pile soil, particularly suitable for long piles.

(5) In the present disclosure, the thrust arm comprises a solid rod and, a hollow rod, an inner end of the solid rod is connected to an outer wall of an arcuate steel plate, and an outer end is inserted in the hollow rod; a nut is provided on the hollow rod; the thrust spring is disposed between the nut and the arcuate steel plate, and all of the thrust springs have the same length and the same elastic coefficients. By expanding the applicable scope of the pressure applied by the thrust spring against the pile soil, the compressed amount of the nut against the thrust spring may be adjusted without adjusting the pile-soil contact degree to thereby change a rate of increasing the pressure intensity applied by the thrust spring to the pile-soil interface from top to down, thereby being adapted to shear testing on the interface between different lengths of piles and soil.

Besides what have been mentioned above, the present disclosure also has other objectives, features, and advantages. Hereinafter, the present disclosure will be described in further detail with reference to the accompanying drawings.

BRIEF DESCRIPTION OF THE DRAWINGS

The drawings constituting part of the present application are used to provide further understanding of the present disclosure. The exemplary embodiments of the present disclosure and their explanations are used for explaining the present disclosure, which do not constitute improper limitation to the present disclosure. In the drawings.

Where 1 Support device; 1.1 Bottom plate; 1.2 Top Plate; 1.3 Support beam; 1.4 Bracing strut, 1a Elongated column; 1b Clamping post; 1c Plug pin; 2 Pressure device; 2.1 Vertical loading means; 2.1a Dowel rod; 2.2 Pressure sensor; 3 Membrane box; 3.1 Membrane barrel; 3.2 Permeable plate; 3.3 Blank cover; 3.4 Holding-down arm; 4 Thrust device; 4.1 Thrust cylinder; 4.1a Arcuate steel sheet; 4.1b Arcuate steel plate; 4.2 Push plate; 4.3 Thrust arm; 4.3b Hollow rod; 4.3c Nut; 4.4 Thrust spring; 4.5 Protective barrel; 4.5a Side hole; 5. Model pile; 6. Model soil.

DETAILED DESCRIPTION OF EMBODIMENTS

Hereinafter, the embodiments of the present disclosure are explained in detail with reference to the accompanying drawings. However, the present disclosure may be implemented in a plurality of different manners as limited and covered by the claims.

Figure 1:
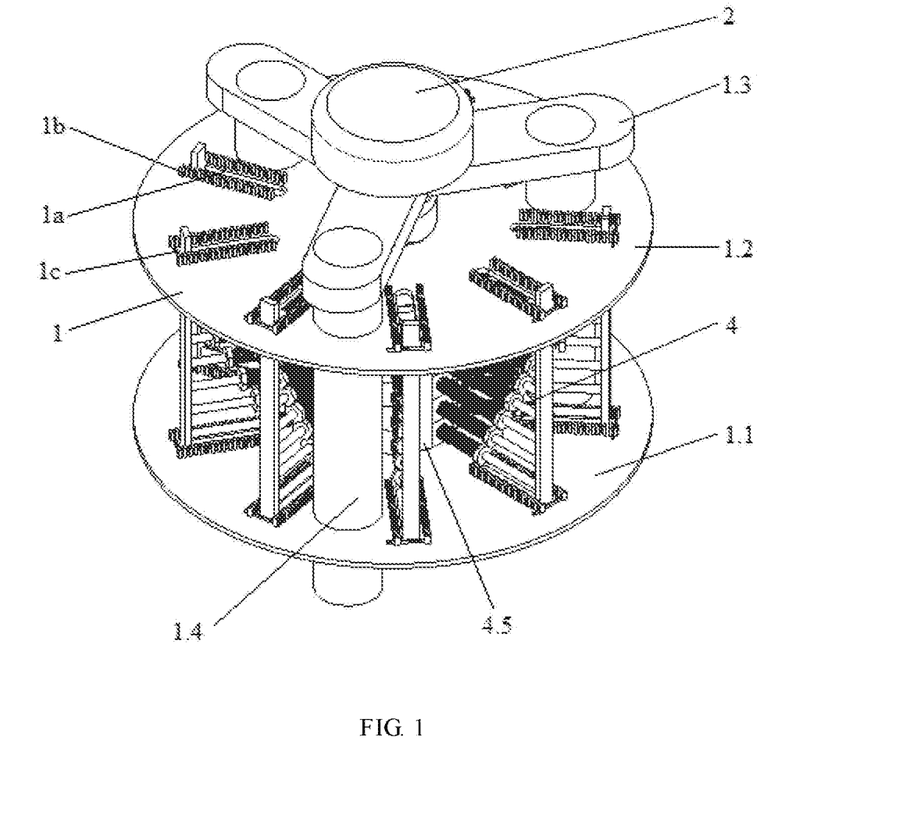
FIG. 1 shows a stereoscopic structural schematic diagram of a test apparatus for pile-soil interface shear mechanical properties.
Figure 2:
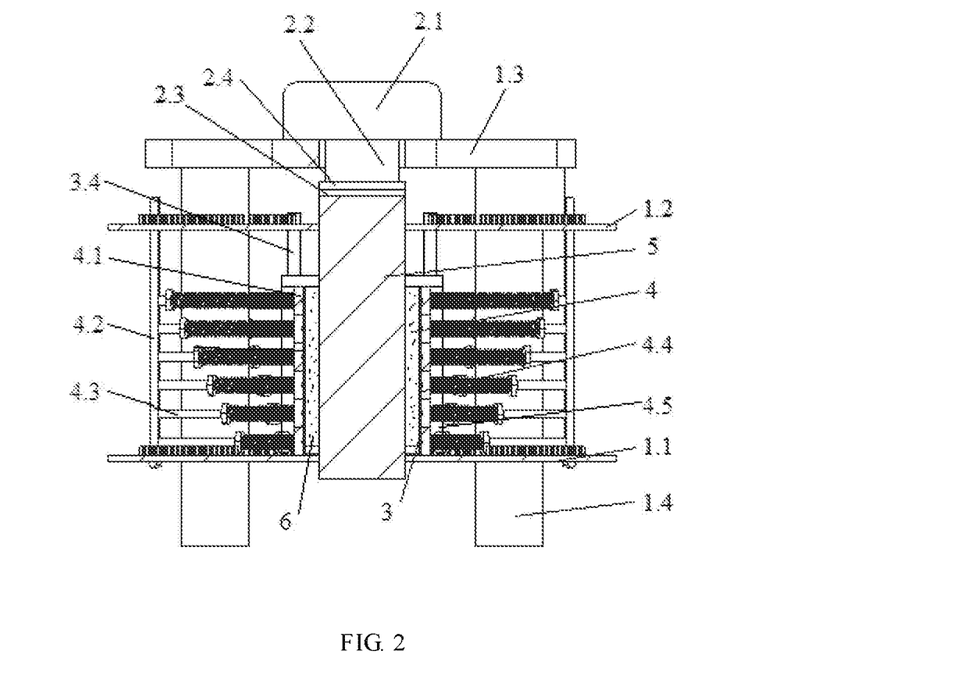
FIG. 2 shows a sectional structural schematic diagram of a test apparatus for pile-soil interface shear mechanical properties in FIG. 1.
Figure 3:
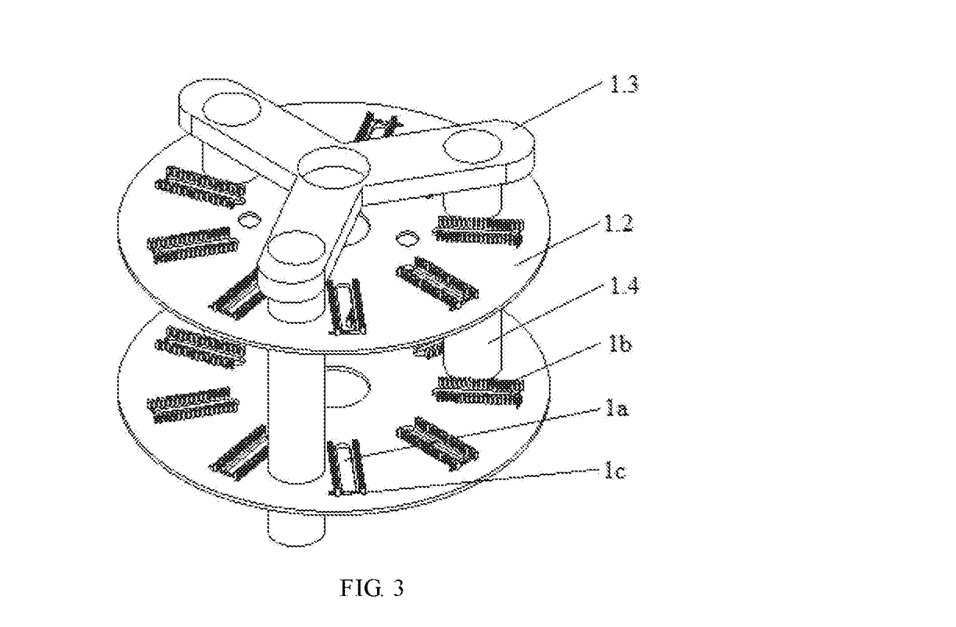
FIG. 3 is a structural schematic diagram of a support device of the present disclosure.

As shown in FIG. 1 and FIG. 2, the present disclosure comprises a test apparatus for pile-soil interface shear mechanical properties, comprising a support device 1, a pressure device 2, a membrane box 3, and a thrust device 4. Their specific structures are provided below:

As shown in FIG. 3, the support device comprises a bottom plate 1.1, a top plate 1.2, a support beam 1.3, and a plurality of bracing struts 1.4; the bottom plate and the top plate are both circular steel plates; a central portion of the bottom plate is provided with a through-hole A for inserting, the model pile 5, a central portion, of the top plate is provided with a through-hole B for inserting the model pile 5, and the through-hole A and the through-hole B are co-axially arranged from top to down with equal hole size. The bottom plate and the top plate are both provided with a plurality of positioning devices evenly arranged along a circumferential direction of respective center thereof, and each of the positioning devices includes an elongated slotted eye 1a arranged along a radial direction of the bottom plate (top plate), a clamping post 1b disposed at two sides of a length direction of the elongated slotted eye, and a latch bolt 1c for positioning internal and external positions of the push plate on the support device.

Specifically, the number of bracing struts is preferably 3; the three bracing struts are all arranged through the bottom plate and the top plate, bottom ends of the bracing struts are 60 cm lower than the bottom plate, and top ends of the bracing struts are 50 cm higher than the top plate, thereby facilitating testing of the model pile. The support beam disposed above the top plate is a trifurcated beam, each fork being provided with a connection hole, the forks being fixedly connected to the bracing struts via the connection holes; the through-hole C is disposed on a central portion of the support beam.

Further, the pressure device comprises vertical loading means 2.1, a dowel rod 2.2, a pressure sensor 2.3, and a displacement sensor 2.4; the vertical loading means is a servo hydraulic press disposed on the support beam; the dowel rod is arranged through the through-hole C from top to down, a top end of the dowel rod being connected to the vertical loading means, and a bottom end of the dowel rod being for contacting with the top end of the model pile; the displacement sensor is disposed on an end face, of the dowel rod, for contacting with the model pile; the pressure sensor is connected with the displacement sensor and sandwiched between the displacement sensor and the model pile. In this structure, the vertical loading means applies a vertical pressure against the model pile via the dowel rod; the displacement sensor is arranged for testing displacement of the model pile, and the pressure sensor is arranged for sensing a pressure applied by the servo hydraulic press against the model pile.

Figure 4:
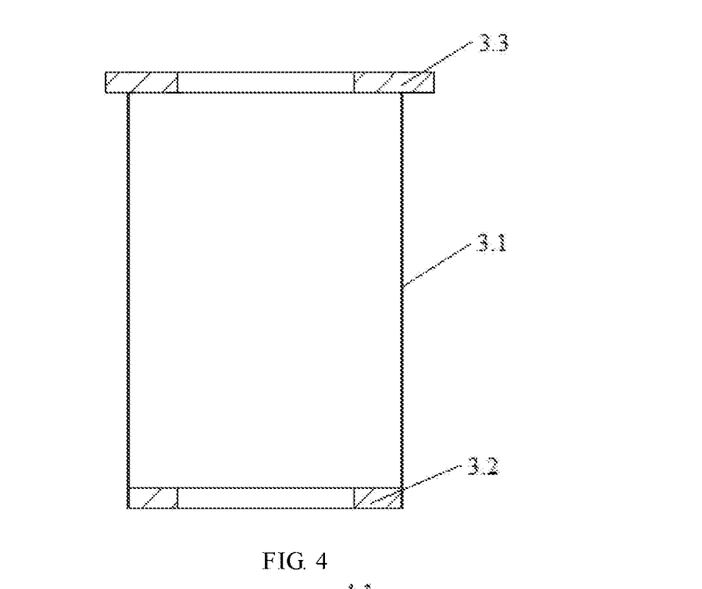
FIG. 4 is a sectional structural schematic diagram of a membrane box of the present disclosure.

Referring to FIG. 4, the membrane box, which is vertically disposed on the bottom plate, comprises a circular membrane barrel 3.1, a permeable plate 3.2, and a blank cover 3.3, the membrane box further comprises three holding-down arms 3.4 that tightly holds down the blank cover against the membrane barrel; the top plate is provided with three through-holes F, each through-hole F being penetrated through by one holding-down arm. The permeable plate is disposed at a bottom portion of the membrane barrel to block the lower port of the membrane barrel, and the blank cover is arranged for tightly sealing the upper port of the membrane barrel; the membrane barrel is arranged for being sleeved at a radial external side of the model pile, and when the model pile is inserted into the membrane box, an accommodating cavity for accommodating the model soil is provided between the membrane barrel and the model pile. The permeable plate and the blank cover are provided with a through-hole D and a through-hole E, respectively, upon testing, the upper and lower ends of the model pile are arranged through the through-hole E and the through-hole D, respectively. Specifically, the membrane barrel is made of a rubber membrane; to prevent an adverse impact on the horizontal force applied by the permeable plate against the thrust device, the permeable plate is provided with a circular permeable plate body disposed at a center thereof and a flexible membrane disposed at an outer peripheral side of the permeable plate body, the through-hole D being disposed at the center of the permeable plate body; the flexible membrane is hermetically connected to the membrane barrel and the permeable plate, respectively, preferably, the flexible membrane is also a rubber membrane. The blank cover is a steel plate movably covering the upper end of the membrane barrel, and is tightly held down against the membrane barrel (the membrane barrel being loaded therein with soil) via the holding-down arms, thereby preventing the model soil in the membrane box from overspill during testing, which would otherwise cause pressure invalid. This structural arrangement not only facilitates loading the model soil into the membrane barrel, but also prevents an adverse impact on narrowing of the diameter of the membrane barrel when the membrane barrel is radially stressed, thereby preventing affecting the simulation effect.

Figure 5:
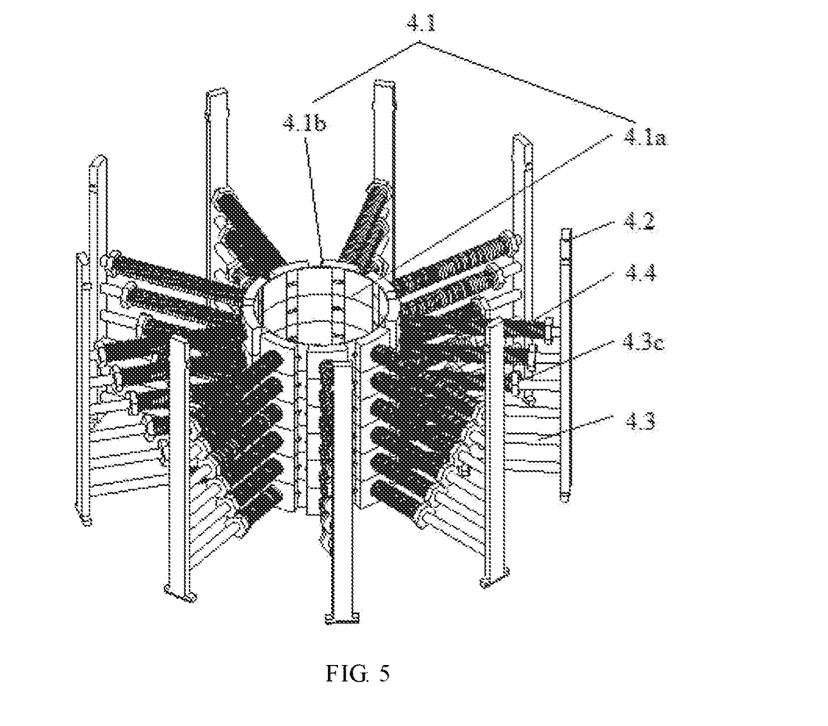
FIG. 5 is a structural schematic diagram of a thrust device of the present disclosure.

Referring to FIG. 5, the thrust device is sleeved on the membrane barrel and arranged for applying a plurality of horizontal thrusting forces to the membrane barrel so as to squeeze the model soil in the membrane along a direction perpendicular to an axial direction of the model pile, the plurality of horizontal thrusting forces incrementing linearly from top to down. Specifically, the thrust device comprises a thrust cylinder group, a plurality of thrust assemblies evenly distributed along a peripheral direction of a center of the thrust cylinder group, and a protective barrel 4.5 sleeved on an outer peripheral wall of the thrust cylinder group; it needs to be particularly noted that to show the internal structure of the thrust device more clearly, the protective barrel in FIG. 5 is not shown. However, those skilled in the art may understand that an outer end of the thrust arm is fixedly connected to the push plate, and an inner end of the thrust arm penetrates through a side hole of the protective barrel and is then fixedly connected to the arcuate steel plate of the thrust cylinder; the thrust spring sleeved on the thrust arm also penetrates through the side hole, contacts with the arcuate steel plate at least under the action of the thrusting force and produces a horizontal thrusting force to the arcuate steel plate.

Figure 6:
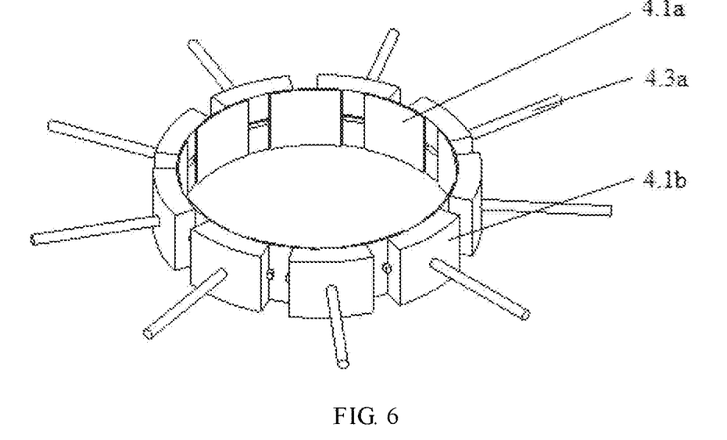
FIG. 6 is a structural schematic diagram of a thrust cylinder in FIG. 5.
Figure 7:
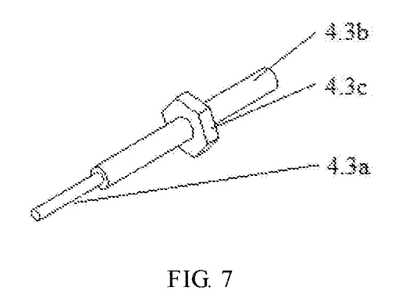
FIG. 7 is a structural schematic diagram of fitting between a thrust arm and a nut in the present disclosure.

With reference to FIGS. 6 and 7, the thrust cylinder group includes a plurality of radially contractile thrust cylinders 4.1, the plurality of thrust cylinders having a same size and being axially stacked on the bottom plate, adjacent two of the thrust cylinders being not fixedly connected; lubrication treatment is performed between two vertically adjacent thrust cylinders 4.1, between the thrust cylinder at the utmost top layer and the blank cover 3.3, and the thrust cylinder at the lowest layer and the bottom plate 1.1. When being subjected to a sidewise horizontal thrusting force, each thrust cylinder is radially contracted dependent on the strength of the subjected horizontal pressure and then applies different pressures from top to down against the model soil and the model pile inside the membrane box. Preferably, the thrust cylinder is a double-layered cylindrical body structure, an inner-layer cylindrical body and an outer-layer cylindrical body being co-axially sleeved, the inner-layer cylindrical body being enclosed by a plurality of arcuate steel sheets 4.1a evenly arranged at intervals along a circumferential direction of the inner-layer cylindrical body, the outer-layer cylindrical body being enclosed by a plurality of arcuate steel plates 4.1b evenly arranged at intervals along, a circumferential direction of the outer-layer cylindrical body; an interval clearance between adjacent two arcuate steel sheets and an interval clearance between adjacent two arcuate steel plates being staggered internally and externally, each arcuate steel plate being horizontally slidably-fitted with two arcuate steel sheets disposed internal thereto along a circumferential direction of the thrust cylinder. When the thrust cylinder is subjected to the sidewise horizontal pressure, the clearance between adjacent two arcuate steel plates and the clearance between adjacent two arcuate steel sheets become narrowed, and diameters of the thrust cylinders cladding the outer sidewall of the membrane barrel becomes smaller.

Each of the thrust assemblies includes a vertically arranged push plate 4.2, a plurality of horizontally-arranged contractile thrust arms 4.3, and a plurality of thrust springs 4.4, wherein the plurality of thrust arms 4.3 are arranged in a same vertical plane along a top-down direction, outer ends of the plurality of thrust arms being all connected to the push plate, inner ends of the plurality of thrust arms being connected, to the arcuate steel plates, respectively, the thrust arms being disposed in one-to-one correspondence to the arcuate steel plates; each thrust arm being sleeved with one thrust spring. In this structure, the arcuate steel plates of a plurality of thrust cylinders that are stacked from top to down are also correspondingly disposed from top to down, wherein arcuate steel plates in the same column are referred to as a group; the number of thrust rods included in each thrust assembly is identical to the number of arcuate steel plates in the same group of arcuate steel plates, and the number of thrust assemblies is identical to the number of groups of the arcuate steel plates. The upper and lower ends of the push plate are arranged through the elongated slotted eyes on the top plate and the bottom plate, respectively, and move, within the elongated slotted eyes, along length directions of the elongated slotted eyes.

Figure 8:
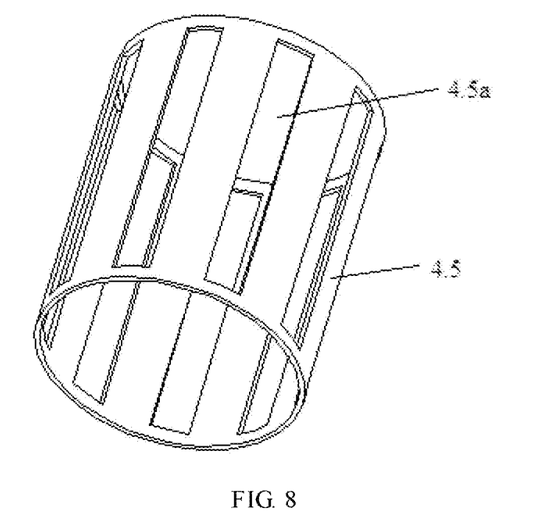
FIG. 8 is a structural schematic diagram of a protective barrel in FIG. 5.

With reference to FIG. 8, a plurality of side holes 4.5a are provided on the side wall of the protective barrel, for the thrust arms and the thrust springs to penetrate through; the protective barrel may effectively prevent an outward tension produced by the model soil inside the membrane barrel, which would otherwise damage the membrane barrel.

In the present disclosure, the thrust arms are arranged in a one-to-one correspondence to the arcuate steel plates; the thrust arms at a same layer connected to the same thrust cylinder are disposed at a same horizontal plane, the inner ends of the thrust arms at the same layer being all pointed to a central axial, line of the thrust cylinder. Specifically, the thrust arm comprises a solid rod 4.3a and a hollow rod 4.3b, an inner end of the solid rod being connected to an outer wall of the arcuate steel plate, an outer end of the solid rod being inserted into the hollow rod. After the push plate is moved a certain distance inwardly, the latch bolt is disposed at an outer side of the push plate and inserted between two adjacent clamping posts to position the push plate; the thrust spring is compressed to apply a sidewise horizontal pressure to the thrust cylinder, while the length of the push plate is jointly determined by the push plate and the thrust spring. In the present disclosure, the horizontal pressure subjected to the thrust cylinder may be computed based on the elastic coefficient and compressed amount of the thrust spring.

In the present disclosure, a stacked height of a plurality of thrust cylinders is identical to the height of the membrane barrel, and the thrust cylinders clad the outer peripheral wall of the membrane barrel, which facilitates the thrust device to apply a horizontal thrusting force against the model pile and the model soil in the membrane box.

By leveraging the apparatus for testing pile-soil interface shear mechanical properties of the present disclosure, when testing the pile-soil interface shear mechanical properties, a thrust device applies to horizontal pressure against the thrust barrels to cause them radially contracted, and radial contraction of the thrust barrels further applies horizontal thrusting forces of different strengths from top to down against, the model soil inside the membrane box, in this way, the horizontal underground pressure against the pile soil may be effectively simulated, thereby facilitating researches on pile soil testing. A specific testing method comprises steps of:

(1) precasting a model pile 5 according to actual conditions of a work, and preparing a model soil 6 of the same soil property as the actual work;

(2) installing the model pile and the model soil: inserting the precast model pile 5 into a membrane barrel 3.1 from a top of the test apparatus, filling the prepared model soil 6 into the membrane barrel, compacting the model, soil according to the actual work, covering a blank cover 3.3 on the membrane barrel after complete compaction, and tightly holding down, using a holding-down arm 3.2, the blank cover against the membrane barrel;

(3) installing a pressure device: detachably installing vertical loading means 2.1 onto a support beam, connecting a top end of the model pile to the vertical loading means via a dowel rod 2.2, sandwiching a pressure sensor 2.3 and a displacement sensor 2.4 between the model pile and the dowel rod, wherein the vertical loading means preferably selects a servo hydraulic press;

(4) applying a horizontal thrusting force to the pile soil: applying multiple layers of horizontal thrusting forces from an outer peripheral side of the membrane barrel towards its axial line direction to squeeze the model soil in the membrane barrel along a direction perpendicular to an axial direction of the model pile, where the multiple layers of horizontal thrusting forces linearly increment from top to down; when pressure intensities produced from a top-layer thrusting force and a bottom-layer thrusting force against the model soil are equal to the pressure intensities at an upper cross-section and a lower cross-section of a to-be-measured pile segment in the actual work, respective layers of horizontal thrusting forces are maintained unchanged. Here, the "pile segment" refers to a segment or entirety of the pile selected according to needs of the work.

(5) Pile-soil interface shear testing: initiating the vertical loading means to apply a vertical pressure against the model pile; under the action of the vertical pressure, the model pile moves vertically, where a stress on and a displacement of the model pile are obtained by the pressure sensor and the displacement sensor, respectively.

(6) pile-soil interface shear stress computing: computing a pile-soil interface shear stress based on the test data obtained from the pile-soil interface shear testing, wherein the pile-soil interface shear stress $J_G = J_S \times L_G / L_T$, where $J_S$ denotes the shear force obtained from the testing in the present disclosure, $L_G$ denotes a length of the model pile, $L_T$ denotes an interval between a top-layer thrust spring and a bottom-layer thrust spring. Specifically, the "length of the model pile" refers to a length of the entire pile or a length of a segment, thereof, as long as the horizontal pressure of the testing device is equal to the horizontal underground pressure of the actual work pile.

In the step (4), the following methods may be adopted to apply the horizontal thrusting forces to the pile soil by the following two methods, specifically:

The first method: free lengths of the thrust springs sleeved on the thrust arms at the same layer are equal, and elastic coefficients of the thrust springs sleeved on each layer of thrust arms increments linearly from top to down. After the model pile and the model soil are installed, by adjusting the push plate inwardly (i.e., along a central axis direction of the membrane barrel), the lengths of the thrust arms are contracted, and then the thrust springs sleeved on the thrust arms are compressed; the thrust springs apply horizontal pressures linearly incrementing from top to down against the pile-soil interface, which is consistent with the situation in the actual work where the subjected underground pressure constantly increases with depth, this may realistically simulate the backfill covering distribution subjected to the pile soil, particularly suitable for long piles.

The second method: the hollow rod is provided with a nut (the hollow rod is threaded), the thrust spring is disposed between the nut and the arcuate steel plate; and the lengths and elastic coefficients of all thrust springs are equal. After the model pile and the model soil are installed, a distance from a nut on each layer of the thrust arm to the thrust cylinder is adjusted to linearly decrease from top to down; by adjusting the push plate inwardly, the thrust spring applies a horizontal pressure linearly incrementing from top to down against the pile-soil interface. This structure may also expand the applicable scope of the pressure applied by the thrust springs against the pile soil, such that the compressed amount against the thrust springs may be adjusted by adjusting the nuts without adjusting the pile-soil contact degree, thereby changing a rate of increasing the pressure intensity applied by the thrust springs to the pile-soil interface from top to down. This structure is suitable for shear testing on the interface between different lengths of piles and the soil.

What have been described above are only preferred embodiments of the present disclosure, not for limiting the present disclosure; to those skilled in the art, the present disclosure may have various alterations and changes. Any modifications, equivalent substitutions, and improvements within the spirit and principle of the present disclosure should be included within the protection scope of the present disclosure.

We claim:

1. A test apparatus for pile-soil interface shear mechanical properties, comprising: a support device (1), a pressure device (2), a membrane box (3), and a thrust device (4); wherein the support device comprises a bottom plate (1.1), a top plate (1.2), and a support beam (1.3), the bottom plate and the top plate being connected via a plurality of bracing struts (1.4), the support beam being disposed above the top plate; the pressure device is disposed on the support beam and arranged for applying a vertical pressure against a model pile (5); a membrane barrel (3.1) of the membrane box is vertically disposed on the bottom plate and sleeved at a radial outer side of the model pile, an accommodating cavity being provided between the membrane barrel and the model pile; the thrust device is sleeved on the membrane barrel and arranged for applying a plurality of horizontal thrusting forces against the membrane barrel so as to squeeze a model soil (6) in the membrane barrel along a direction perpendicular to an axial direction of the model pile, the plurality of horizontal thrusting forces incrementing linearly from top to down.

2. The test apparatus for pile-soil, interface shear mechanical properties according to claim 1, characterized in that the thrust device comprises a thrust cylinder group, a plurality of thrust assemblies evenly arranged along a circumferential direction of a center of the thrust cylinder group, and a protective barrel (4.5) sleeved on an outer circumferential wall of the thrust cylinder group;

the thrust cylinder group includes a plurality of radially contractile thrust cylinders (4.1), the plurality of thrust cylinders being axially stacked on the bottom plate, adjacent two of the thrust cylinders being not fixedly connected;

each of the thrust assemblies includes a vertically arranged push plate (4.2), a plurality of horizontally-arranged contractile thrust arms (4.3), and a plurality of thrust springs (4.4), wherein the plurality of thrust arms are arranged in, a same vertical plane along a top-down direction, outer ends of the plurality of thrust arms are all connected to the push plate, inner ends of the plurality of thrust arms are connected to the thrust cylinders, respectively, and the thrust arms are disposed in one-to-one correspondence to the thrust cylinders; each thrust arm is sleeved with one thrust spring; and a plurality of side holes (4.5a) are provided in a side wall of the protective barrel, for the thrust arms and the thrust springs to penetrate through.

3. The test apparatus for pile-soil interface shear mechanical properties according to claim 2, characterized in that the thrust cylinder is a double-layered cylindrical body structure, an inner-layer cylindrical body and an outer-layer cylindrical body being co-axially sleeved, the inner-layer cylindrical body being enclosed by a plurality of arcuate steel sheets (4.1a) evenly arranged at intervals along a circumferential direction of the inner-layer cylindrical body, the outer-layer cylindrical body being enclosed by a plurality of arcuate steel plates (4.1b) evenly arranged at intervals along a circumferential direction of the outer-layer cylindrical body; a spacing clearance between adjacent two arcuate steel sheets and a spacing clearance between adjacent two arcuate steel plates are staggered internally and externally, each arcuate steel plate being horizontally slidably-fitted with two arcuate steel sheets disposed internal thereto along a circumferential direction of the thrust cylinder; inner ends of the plurality of thrust arms are connected to the arcuate steel plates, respectively; and the thrust arms and the arcuate steel plates are disposed in one-to-one correspondence; and the thrust arms at a same layer connected to the same thrust cylinder are disposed at a same horizontal plane, and the inner ends of the thrust arms at the same layer are all pointed to a central axial line of the thrust cylinder.

4. The test apparatus for pile-soil interface shear mechanical properties according to claim 3, characterized in that the thrust arm comprises a solid rod (4.3a) and a hollow rod (4.3b), an inner end of the solid rod being connected to an outer sidewall of the arcuate steel plate, an outer end of the solid rod being slidably inserted into the hollow rod.

5. The test apparatus for pile-soil, interface shear mechanical properties according to claim 4, characterized in that free lengths of the thrust springs sleeved on the thrust arms at the same layer are equal, and elastic coefficients of the thrust springs sleeved on each layer of thrust arms increment linearly from top to down.

6. The test apparatus for pile-soil interface shear mechanical properties according to claim 4, characterized in that a nut (4.3) is provided on the hollow rod; the thrust springs are disposed between the nut and the arcuate steel plate; and the free lengths and elastic coefficients of all thrust springs are equal.

7. The test apparatus for pile-soil interface shear mechanical properties according to claim 2, characterized in that the top plate and the bottom plate are both circulate plates, the bottom plate and the top plate are both provided with a plurality of positioning devices evenly arranged along a circumferential direction of respective center thereof, and each of the positioning devices includes an elongated slotted eye (1a) arranged along a radial direction of the bottom plate, a plurality of clamping posts (1b) disposed at two sides of a length direction of the elongated slotted eye, and a latch bolt (1c) for positioning internal and external positions of the push plate on the support device.

8. The test apparatus for pile-soil interface shear mechanical properties according to claim 1, characterized in that a through-hole A and a through-hole B for inserting the model pile are provided on the bottom plate and the top plate, respectively; the plurality of bracing struts are all arranged through the bottom plate and the top plate from top to down; the support beam is connected to the plurality of bracing struts, a through-hole C being provided on the support beam;

the pressure device comprises vertical loading means (2.1), a dowel rod (2.2), a pressure sensor (2.3), and a displacement sensor (2.4); the vertical loading means is detachably disposed on the support beam; the dowel rod is arranged through the through-hole C, one end of which is connected to the vertical loading means, the other end of which is in contact with a top end of the model pile; the pressure sensor and the displacement sensor are sandwiched between the dowel rod and the model pile;

the membrane box comprises a membrane barrel (3.1), a permeable plate (3.2), and a blank cover (3.3); wherein the membrane barrel is made of a flexible material; the permeable plate is disposed inside the membrane barrel to block a lower port of the membrane barrel; the blank cover is disposed at a top portion of the membrane barrel to seal an upper port of the membrane barrel; the permeable plate and the blank cover are provided with a through-hole D and a through-hole E, respectively, an upper end and a lower end of the model pile being arranged through the through-hole E and the through-hole D, respectively.

9. The test apparatus for pile-soil interface shear mechanical properties according to claim 8, characterized in that the permeable plate comprises a permeable plate body and a flexible membrane disposed peripheral to the permeable plate body, the through-hole D being disposed on the permeable plate body; the membrane box further comprises at least three holding-down arms (3.4) that tightly hold down the blank cover against the membrane barrel; a plurality of through-holes F are provided on, the top plate, each of the through-holes F being penetrated through by one holding-down arm, lower ends of the holding-down arms being compressed against the blank cover.

10. The test apparatus for pile-soil interface shear mechanical properties according to claim 8, characterized in that the support device comprises three bracing struts, bottom ends of the bracing struts are 50~200 cm lower than the bottom plate, top ends of the bracing struts are 30~200 cm higher than the top plate; the support beam is a trifurcated beam, each beam fork being fixedly connected to one bracing strut; the through-hole C is disposed at a central portion of the trifurcated beam.

* * * * *